(No Model.) 2 Sheets—Sheet 1.
S. FORTER.
VALVE FOR REGENERATIVE STOVES OR FURNACES.
No. 464,195. Patented Dec. 1, 1891.
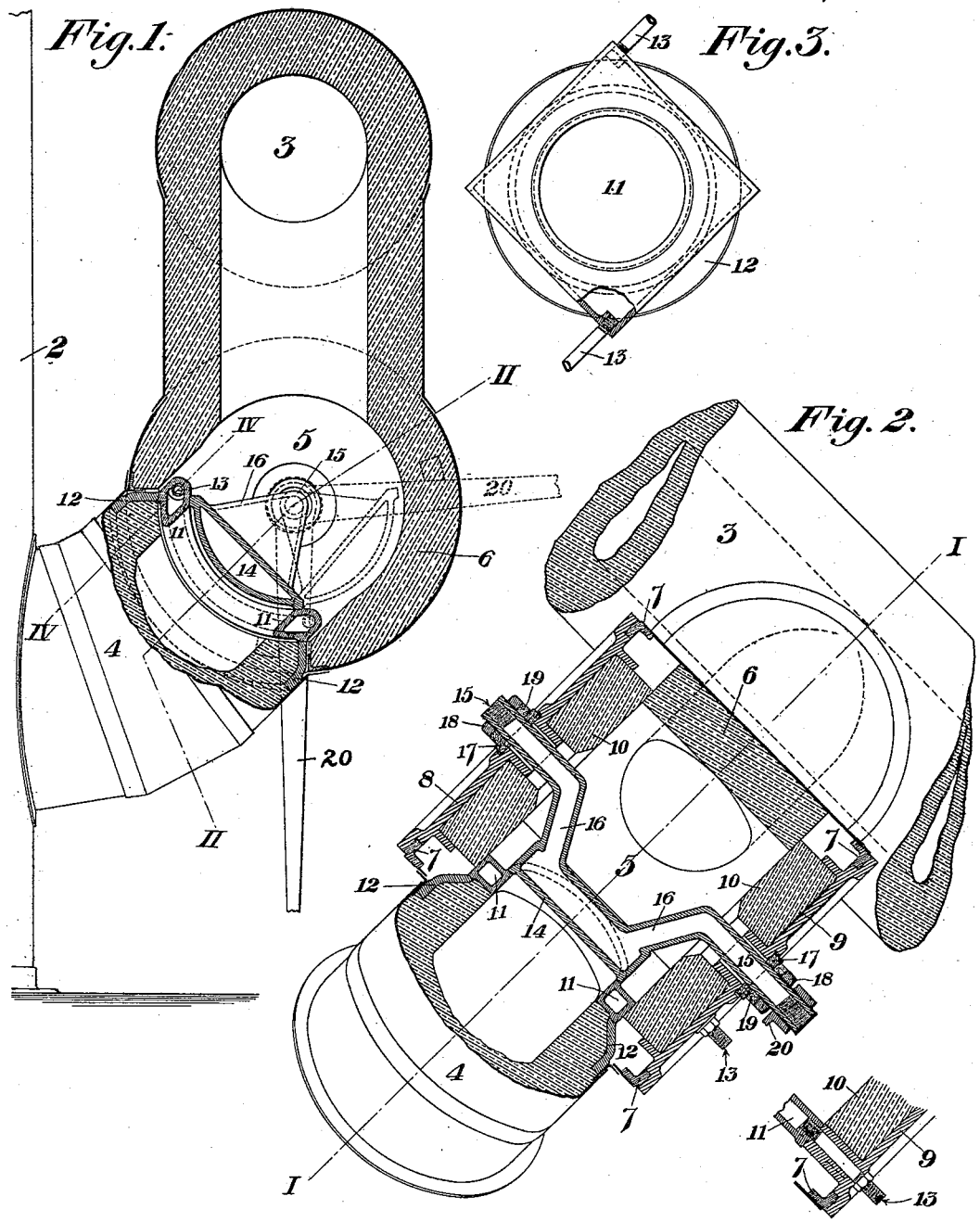
WITNESSES
INVENTOR

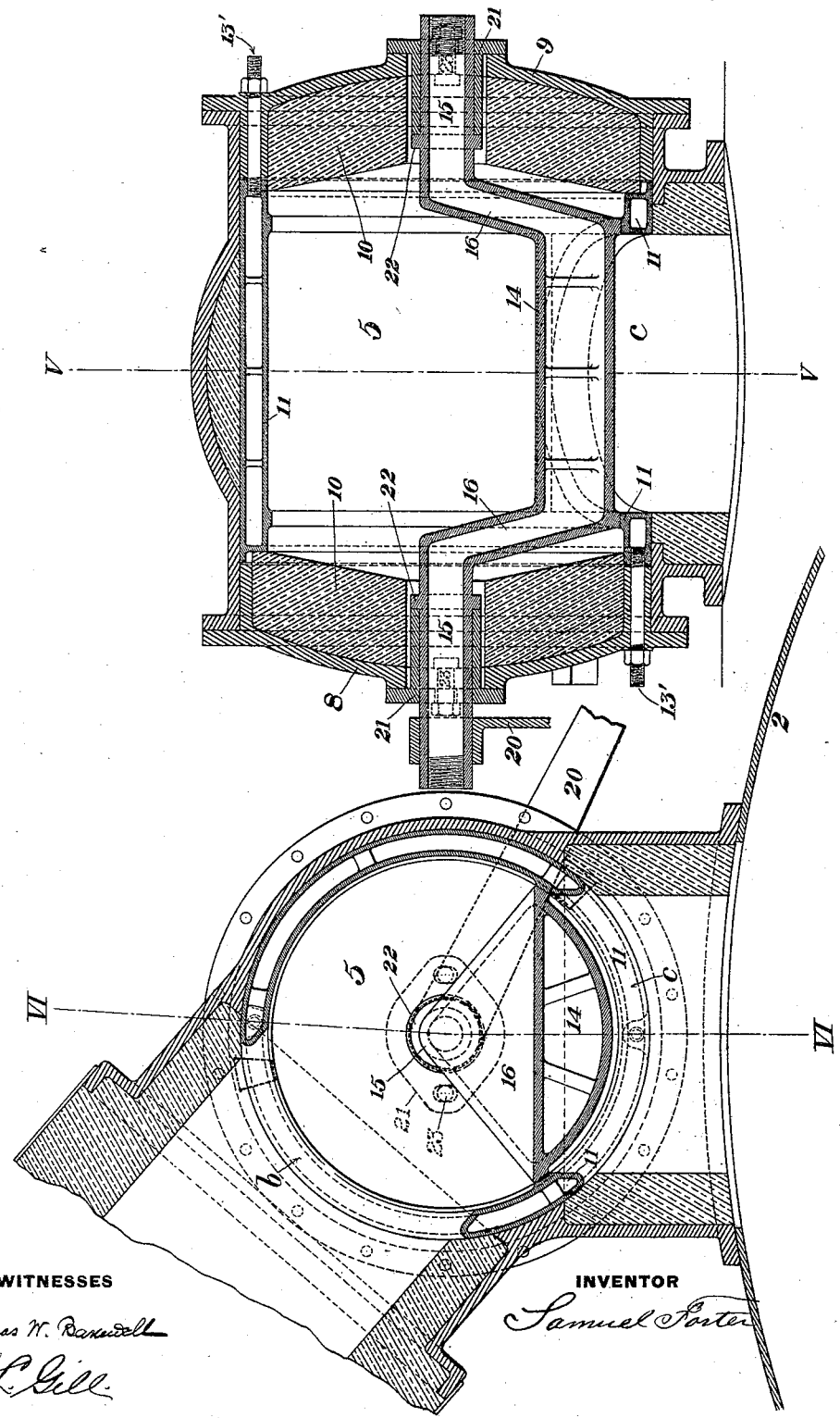

UNITED STATES PATENT OFFICE.

SAMUEL FORTER, OF ALLEGHENY, PENNSYLVANIA.

VALVE FOR REGENERATIVE STOVES OR FURNACES.

SPECIFICATION forming part of Letters Patent No. 464,195, dated December 1, 1891.

Application filed April 20, 1891. Serial No. 389,589. (No model.)

*To all whom it may concern:*

Be it known that I, SAMUEL FORTER, a resident of Allegheny, in the county of Allegheny and State of Pennsylvania, have invented a new and useful Improvement in Valves for Regenerative Stoves and Furnaces, of which the following is a full, clear, and exact description, reference being had to the accompanying drawings, in which—

Figure 1 is a vertical section of the valve shown in connection with a hot-blast stove, the section being on the line I I of Fig. 2. Fig. 2 is a cross-section on the line II II of Fig. 1. Fig. 3 is a plan view of the valve-seat, showing the water connections. Fig. 4 is a detail view, shown as if in section on the line IV IV of Fig. 1. Fig. 5, Sheet 2, is a cross-sectional view of a modified construction of the valve, the section being on the line V V of Fig. 6; and Fig. 6 is a vertical section on the line VI VI of Fig. 5.

Like symbols of reference indicate like parts in each.

The object of my invention is to provide improved valve mechanism for regenerative or hot-blast stoves or furnaces adapted to be used to control either the inlet or outlet passages for air or gas. The complication of construction, the difficulty of setting and removal, the labor and time required for operation, and the frequent defectiveness of prior valves have induced me to develop my improvement.

Referring to the figures on Sheet 1 of the drawings, 2 represents the side of a hot-blast stove. 3 is the hot-blast main or pipe which communicates with the stove through an elbow-pipe 4 and an interposed valve-chamber 5. Said valve-chamber consists of a cylindrical hollow casing provided on the interior with a fire-brick lining 6, and having at its ends annular metal flanges 7, securely riveted or bolted to the casing. The ends of the cylindrical valve-chamber are closed by disk-shaped covers 8 9, which are bolted to the rings 7, and are lined in the interior with a fire-brick lining 10. The communication with the hot-blast main and with the elbow 4 is at the sides of the valve-chamber, and at the opening between the valve-chamber and the elbow is the valve-seat 11, consisting of a hollow annular casting fitted upon a metal collar 12, which is riveted to the end of the elbow. The hollow valve-seat has inlet and outlet pipe connections 13, by means of which the seat can be kept filled with a constant cooling-current of water or other fluid. These connections are shown in Fig. 3, and one of them is illustrated in detail in Fig. 4. As shown in the latter figure, the pipes extend through passages in the covers 8 or 9, and thus serve not only to supply means for cooling the valve-seat, but also hold it in place. I prefer to make the holes in the cover somewhat larger than the pipes, in order to afford to the latter a little play and to enable the valve-seat to fit accurately on the collar. The central opening of the valve-seat through which the gas or air passes is circular in outline and its margin is shaped to accommodate the valve 14, which seats thereon. Said valve consists of a hollow casting, circular in outline, as shown in Figs. 1 and 2, and having preferably at the margin a bead or flange adapted to fit on the seat. It has also two oppositely-extending hollow trunnions 15, situate in line with each other, but out of line from the valve, with which they communicate through hollow transverse connecting-arms 16. When the valve is in position, the trunnions 15 extend through holes in the opposite covers 8 9 and are rotatory therein. These holes in the covers are preferably provided with integral inwardly-projecting cylindrical flanges or bushings. Around the trunnions on the outer sides of the covers are metal washers 17, which fit against circular seats, and outside these washers are encircling nuts 18, between which and the washers 17 are interposed elastic washers or springs 19. The trunnions therefore have their bearings in the washers 17, which are forced against the covers by the nuts, while the interposed elastic washers prevent all undue strain which might arise from unequal expansion of the valve and casing. The holes in the covers through which the trunnions pass are made of greater diameter than the trunnions to afford to the valve freedom of motion in adjusting itself to its seat. The valve is cooled by water or other fluid introduced and discharged through pipes which are coupled to the ends of the hollow trunnions. To move the valve to and from its seat, I employ a lever 20, which is fixed to one of the trunnions.

In Fig. 1 I show in full lines the valve bearing on its seat. By elevating the lever the trunnions are rotated and the valve is swung radially and thus lifted from the seat in a circular arc, as illustrated by dotted lines in Fig. 1. The motion of the valve is effected in this manner with little labor, and it can be operated with much greater rapidity than can the puppet-valves or slide-valves heretofore used for like purposes, and, as compared with the well-known butterfly-valves, my valve has the advantage of seating accurately and completely closing the opening through the valve-seat. The constant current of water through the valve, which the construction makes possible, effectually prevents burning or other injury from heat.

Another important advantage resulting from my improved apparatus consists in the easy removability of the valve-seat for purposes of repair or otherwise.

In order to expose the valve-chambers and to remove the valve-seat, it is only necessary to uncouple the water connections and the nut and washers at one trunnion and to detach and remove one of the covers. The valve-chamber is then open and the valve-seat can be lifted and taken out. The valve itself can be removed by taking off the nut, washer, and lever from the other trunnion and drawing the valve out laterally. This work is done without disturbing the blast-pipe connections or rebuilding any of the masonry.

In Figs. 5 and 6 I show a modification of my invention, in which the valve-seat, instead of being a hollow casting limited to the mouth of the opening through which the gases pass, is composed of a cylindrical hollow-walled casting, which fits as a lining within the casing of the valve-chamber, and is provided with circular openings at $b$ and $c$ to permit passage of the air or gas. The valve is seated on the margin of the opening $b$. The water is introduced and discharged through the pipes 13', and not only serves to cool the seating-place of the valve, but the entire inner lining of the valve-chamber as well. The valve is shown in these figures constructed substantially the same as shown in Figs. 1 and 2, except that to hold the trunnions and to seal the joints thereat I show bushings 21, which fit around the trunnions within the holes in the cover, bear at their inner ends against collars 22 on the trunnions, and are secured to the cover by bolts 23, which pass through slots, so as to afford to the valve slight vertical play for the purpose above explained.

Other modifications in the form, relative arrangement, and construction of the parts may be made by the skilled mechanic within the scope of my invention, as stated in the claims, since, I believe, I am the first to devise a swinging water-cooled valve of this character supported by rotary trunnions, and also the first to devise such valve-chamber having removable ends to expose the removable seat and valve, whether the valve contained therein is rotatory or otherwise constructed and movable.

I claim—

1. The combination, with a valve-casing and its ports for regenerative stoves or furnaces, said casing having a lining of refractory material, of a valve having trunnions situate out of line from the valve, but opposite the middle thereof, and having water-passages extending through its trunnions, whereby on turning the trunnions a swinging radial motion is imparted to the valve, substantially as and for the purposes described.

2. A valve-chamber for regenerative stoves or furnaces, said chamber having a lining of refractory material, a lateral valve-seat, and a valve having a passage therethrough for circulation of a cooling medium, and an end or cover removable to expose the valve and seat, substantially as and for the purposes described.

3. In a valve apparatus for regenerative stoves or furnaces, the combination of a valve-chamber having a lateral opening, removable ends or covers having refractory linings, and a valve having trunnions extending through the covers, substantially as and for the purposes described.

4. The combination, with a valve-casing and its ports for regenerative stoves or furnaces, of a valve having trunnions on which it is rotatory, said trunnions being out of line from the valve, whereby on turning the trunnions a swinging radial motion is imparted to the valve, and said trunnions being set in holes in which they have lateral play, substantially as and for the purposes described.

5. In valve apparatus for regenerative stoves or furnaces, the combination, with a valve-chamber having ports therein, of a valve having trunnions extending through openings at the opposite ends of the chamber, washers encircling the trunnions and sealing the openings, nuts on the trunnions outside the washers, and elastic washers interposed between the first-named washers and nuts, substantially as and for the purposes described.

In testimony whereof I have hereunto set my hand this 15th day of April, A. D. 1891.

SAMUEL FORTER.

Witnesses:
 THOMAS W. BAKEWELL,
 R. H. WHITTLESEY.